United States Patent
Irie et al.

(10) Patent No.: US 8,363,528 B2
(45) Date of Patent: Jan. 29, 2013

(54) ELECTRONIC DEVICE

(75) Inventors: Kohsuke Irie, Kobe (JP); Ryoh Ogata, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 0 days.

(21) Appl. No.: 12/937,030

(22) PCT Filed: Feb. 26, 2009

(86) PCT No.: PCT/JP2009/053532
§ 371 (c)(1),
(2), (4) Date: Dec. 14, 2010

(87) PCT Pub. No.: WO2009/125629
PCT Pub. Date: Oct. 15, 2009

(65) Prior Publication Data
US 2011/0134727 A1    Jun. 9, 2011

(30) Foreign Application Priority Data
Apr. 10, 2008    (JP) ................................. 2008-102872

(51) Int. Cl.
*G11B 20/00*    (2006.01)
(52) U.S. Cl. ............... 369/53.45; 369/53.41; 369/53.18; 369/2
(58) Field of Classification Search .......... 369/2, 4–6, 369/10, 11, 53, 18, 53.2, 53.31, 53.18, 53.37, 369/53.45, 53.41
See application file for complete search history.

(56) References Cited

U.S. PATENT DOCUMENTS

| | | | | |
|---|---|---|---|---|
| 5,081,616 A | * | 1/1992 | Kitahara et al. | 369/30.1 |
| 5,130,961 A | * | 7/1992 | Namiki et al. | 369/6 |
| 5,150,340 A | * | 9/1992 | Miura et al. | 369/33.01 |
| 5,815,468 A | * | 9/1998 | Muramatsu et al. | 369/2 |
| 5,917,781 A | * | 6/1999 | Kim | 369/4 |
| 6,147,938 A | * | 11/2000 | Ogawa et al. | 369/12 |
| 2001/0012243 A1 | * | 8/2001 | Hasegawa et al. | 369/6 |
| 2003/0120398 A1 | * | 6/2003 | Matumoto et al. | 701/1 |
| 2009/0271103 A1 | * | 10/2009 | Nishio | 701/200 |

FOREIGN PATENT DOCUMENTS

| | | |
|---|---|---|
| JP | 60085456 A * | 5/1985 |
| JP | A-3-211917 | 9/1991 |
| JP | A-2001-141499 | 5/2001 |

OTHER PUBLICATIONS

International Search Report dated Jun. 9, 2009 in corresponding International Application No. PCT/JP2009/053532 (with translation).

(Continued)

*Primary Examiner* — Thang Tran
(74) *Attorney, Agent, or Firm* — Oliff & Berridge, PLC (57) ABSTRACT

An electronic device that can reduce a noise caused by a signal or data being always output. A vehicle-mounted device includes: a player that reads out and outputs data recorded in a CD or a DVD (i.e., a TBCK signal, a TSD0 signal, and a TWS signal); a controller that receives the data (i.e., the TBCK signal, the TSD0 signal, and the TWS signal) output from the player, and executes various controls based on the received data; and an interrupt unit that interrupts transmission of the data recorded in the CD or the DVD to the controller until the CD or the DVD is inserted into the player.

13 Claims, 7 Drawing Sheets

OTHER PUBLICATIONS

Written Opinion of the International Searching Authority dated Jun. 9, 2009 in corresponding International Application No. PCT/JP2009/053532 (with translation).

May 8, 2012 Office Action issued in Japanese Patent Application No. 2008-102872 (with English-language translation).

\* cited by examiner

| FM RECEPTION FREQUENCY | 87.5 | 93.15 | 98.75 | 101.6 | 104.4 |
|---|---|---|---|---|---|
| S/N(WHEN INTERRUPT UNIT 182 IS NOT ARRANGED ON SUBSTRATE 101)(dB) | 21 | 36 | 43 | 34 | 39 |
| S/N(WHEN INTERRUPT UNIT 182 IS ARRANGED ON SUBSTRATE 101)(dB) | 28 | 40 | 45 | 42 | 40 |
| EFFECT | 7dB up | 4dB up | 2dB up | 8dB up | 1dB up |

S/N (Signal to Noise ratio) : VALUE OF S/N INCREASES IF THERE IS NO NOISE

ELECTRONIC DEVICE

FIELD OF THE INVENTION

The present invention relates to an electronic device.

BACKGROUND OF THE INVENTION

Conventionally, there has been disclosed a navigation device which has a DVD drive reading out map information from a DVD medium, a receiver of FM electric waves, and a controller controlling the whole device (see Reference 1). The DVD drive and the receiver are connected to the controller.

[Reference 1] Japanese Unexamined Patent Publication No. 2001-141499

DISCLOSURE OF THE INVENTION

Problems to be Solved by the Invention

In the above-mentioned navigation device, a bit clock signal is output from the DVD drive to the controller regardless of whether the DVD drive is used. Therefore, there is a problem that a noise is caused in the electric wave signal received by the receiver.

The present invention has been made in view of the above circumstances, and an object of the present invention is to provide an electronic device that can reduce a noise caused by a signal or data being always output.

Means to Solve the Problems

To attain the above object, according to a first aspect of the present invention, there is provided an electronic device, including: a data readout portion that reads out and outputs data recorded in a recording medium; a controller that receives the data output from the data readout portion, and executes various controls based on the received data; and an interrupt portion that interrupts transmission of the data recorded in the recording medium to the controller until the recording medium is inserted into the data readout portion.

With this construction, it is possible to reduce a noise caused by a signal or data being always output.

Effects of the Invention

In accordance with the present invention, it is possible to reduce a noise caused by a signal or data being always output.

DESCRIPTION OF THE PREFERRED EMBODIMENTS

The following is a detailed description of preferred embodiments of the present invention, with reference to the accompanying drawings.

Figure 1:
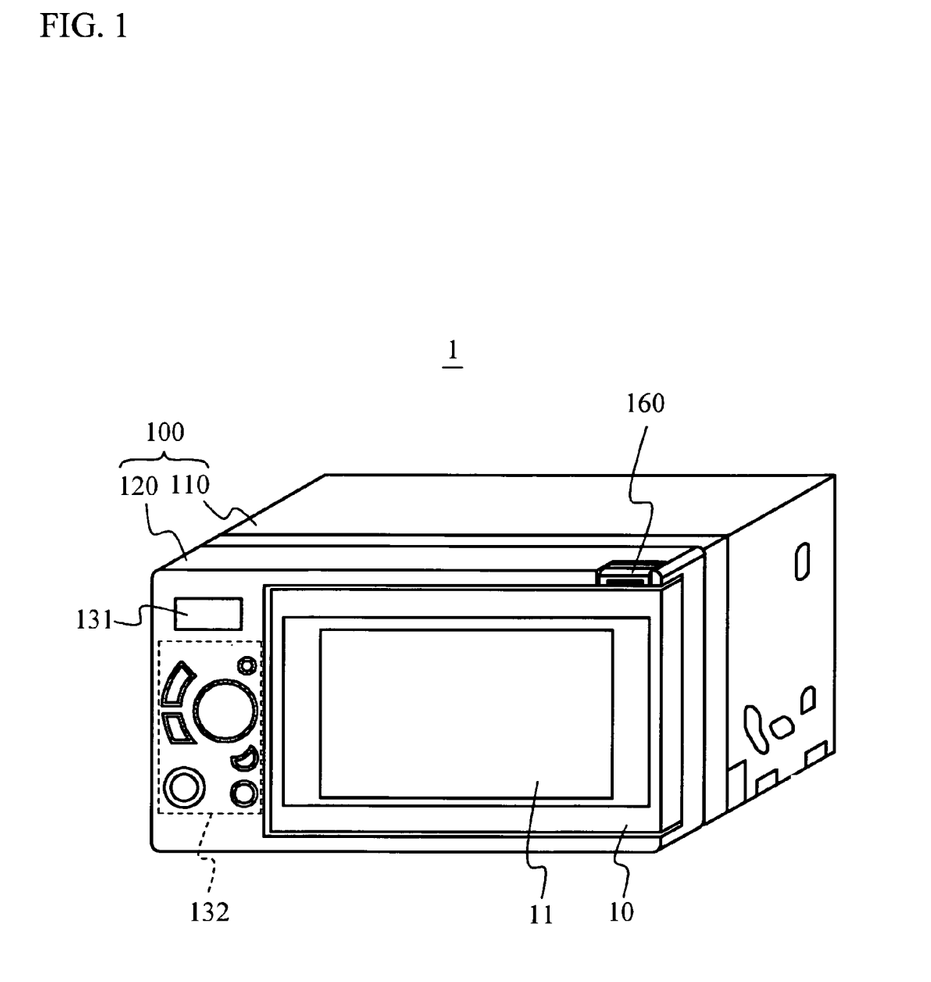
FIG. 1 is a diagram showing an exterior shape of a vehicle-mounted system including a vehicle-mounted device as an electronic device in accordance with a present embodiment.

FIG. 1 is a diagram showing an exterior shape of a vehicle-mounted system including a vehicle-mounted device as an electronic device in accordance with a present embodiment.

As shown in FIG. 1, the vehicle-mounted system 1 is composed of: an vehicle-mounted device 100 (an electronic device) to be mounted in a vehicle; and a portable device 10 (a portable device) with navigation capabilities. The portable device 10 can be used after being attached at a front face portion 120 of the vehicle-mounted device 100, and can be also used alone after being detached from the vehicle-mounted device 100.

The vehicle-mounted device 100 has a playing function of radio broadcasting and a playing function of music data and video data recorded on a recording medium such as a CD (Compact Disk) and a DVD (Digital Versatile Disk). Also, the vehicle-mounted device 100 includes: a main unit 110 having a player of the recording medium and an insertion/ejection slot of the recording medium; and the front face portion 120 (a cover member) having a display unit 131 and an operating unit 132.

The portable device 10 has navigation capabilities of searching for a guiding path to a destination and displaying the searched guiding path over a map.

Figure 2:
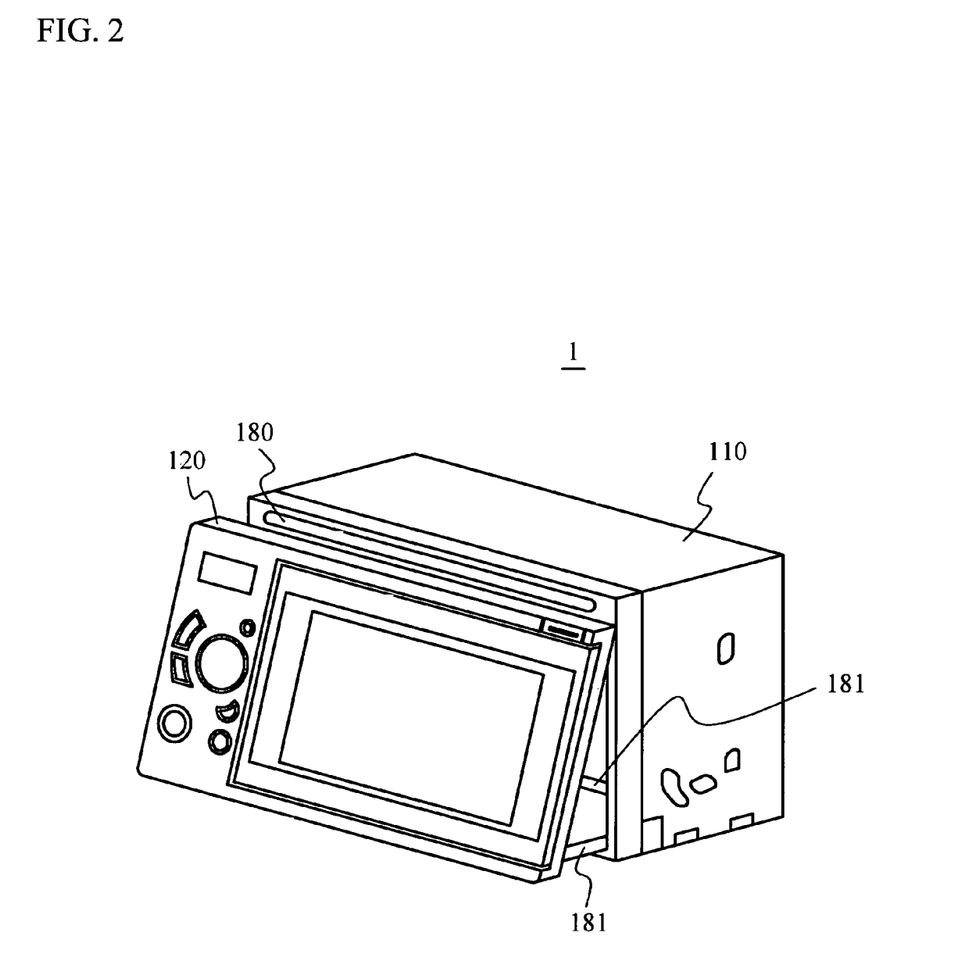
FIG. 2 is a diagram showing a state of tilting a front face portion against a main unit to expose an insertion/ejection slot.

FIG. 2 is a diagram showing a state of tilting the front face portion 120 against the main unit 110 to expose an insertion/ejection slot 180.

By driving a slider 181 shown in FIG. 2 with a drive mechanism, not shown, the front face portion 120 can be tilted against the main unit 110. By tilting operation, the insertion/ejection slot 180 provided in the main unit 110 is exposed, so that the recording medium can be inserted or ejected. There is provided an operation button (a tilt/eject button 132a shown in FIG. 5), at the front face portion 120 of the vehicle-mounted device 100, and a tilt angle can be set according to the operation of the button.

Figure 3:
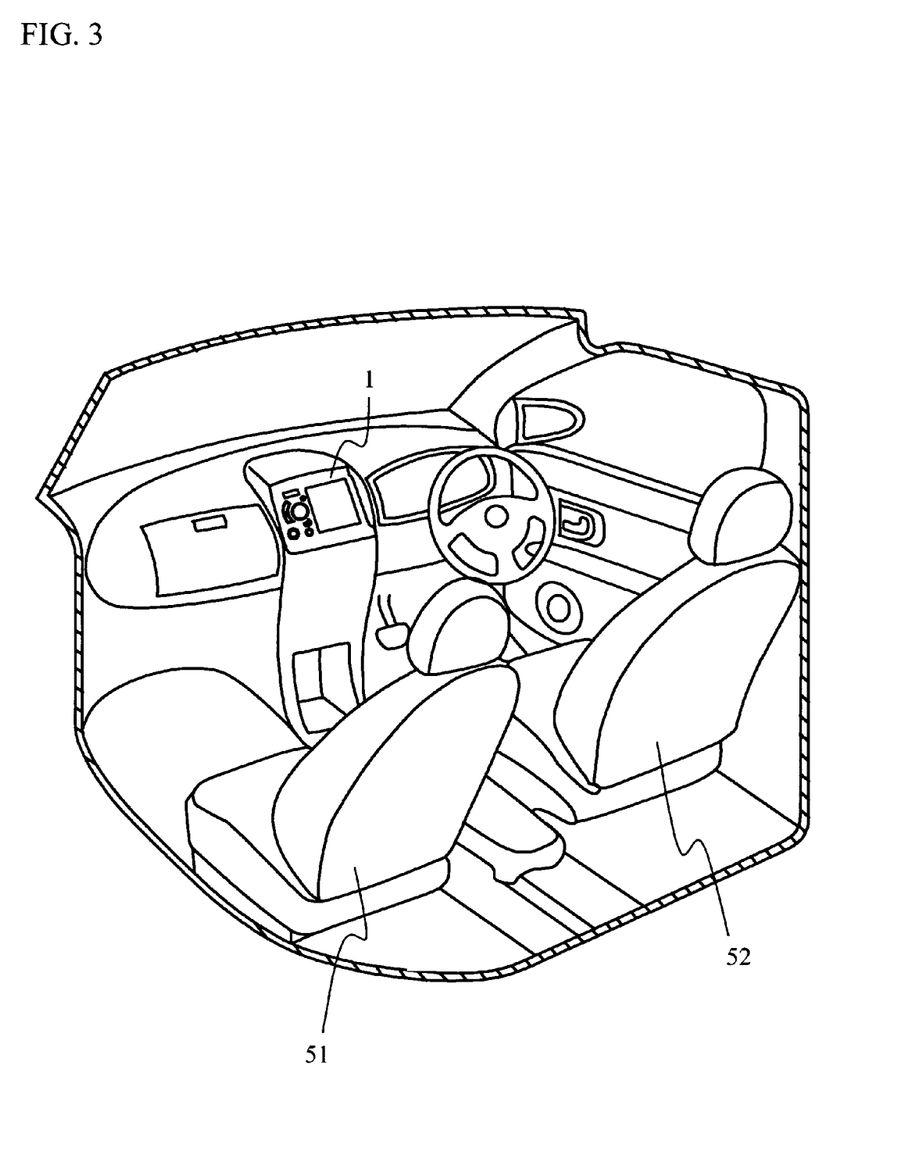
FIG. 3 is a diagram showing an example of mounting the vehicle-mounted system in a vehicle.

FIG. 3 is a diagram showing an example of mounting the vehicle-mounted system 1 in the vehicle.

The in-vehicle system 1 may be disposed in a dashboard portion substantially in the middle of a front-passenger's seat 51 and a driver's seat 52, as shown in FIG. 3, for example. A GPS antenna, not shown, in a GPS information receiver 133 described later is disposed on a dashboard or inside a front glass of the vehicle.

Figure 4:
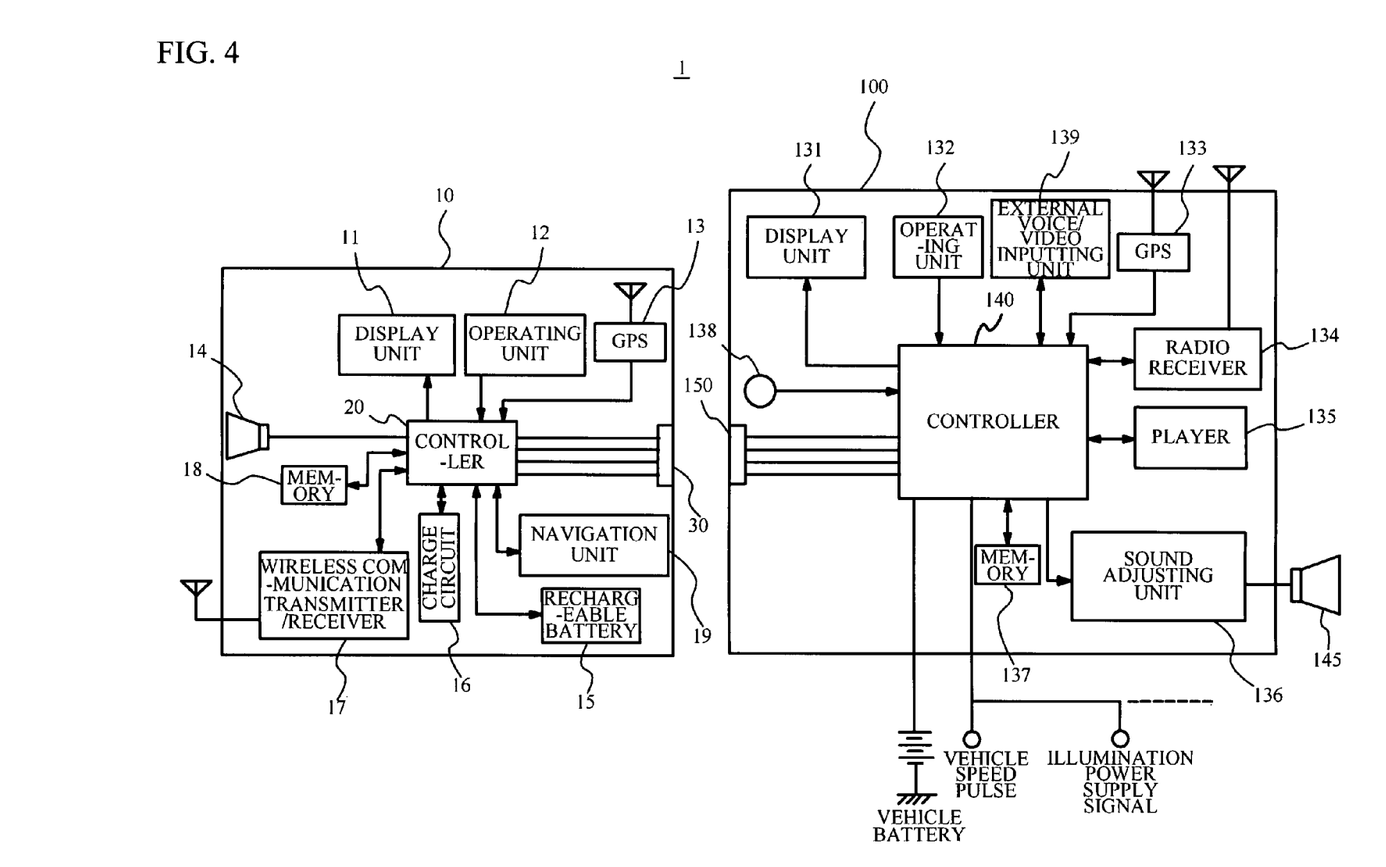
FIG. 4 is a block diagram showing a schematic configuration of the vehicle-mounted system.

FIG. 4 is a block diagram showing a schematic configuration of the vehicle-mounted system 1.

The vehicle-mounted device 100 and the portable device 10 are electrically connected by connectors. The connector 150 is provided at a side of the vehicle-mounted device 100, and a connector 30 is provided at the portable device 10. By connecting the connectors 150 and 30, various signals are sent and received between the vehicle-mounted device 100 and the portable device 10 to function as the vehicle-mounted system 1. The connectors 150 and 30 are respectively provided with power supply terminals for supplying power to the portable device 10 from a battery of the vehicle. When the portable device 10 is connected to the vehicle-mounted device 100 and the power is supplied to the vehicle-mounted device 100, the power is also supplied to the portable device 10 via the power supply terminals.

The vehicle-mounted device 100 is provided with: the display unit 131; the operating unit 132; the GPS information receiver 133; a radio receiver 134; a player 135; a sound adjusting unit 136; a memory 137; a microphone 138; an external voice/video inputting unit 139; a controller 140; and the connector 150. The vehicle-mounted device 100 is activated by supplying the power from the battery of the vehicle, when the engine key is positioned at Acc (Accessory) or IG (Ignition).

The display unit 131 is provided with a liquid crystal panel and a backlight, and displays a frequency of the received broadcasting, a track number of music being reproduced, a music name being reproduced, and the like.

Figure 5:
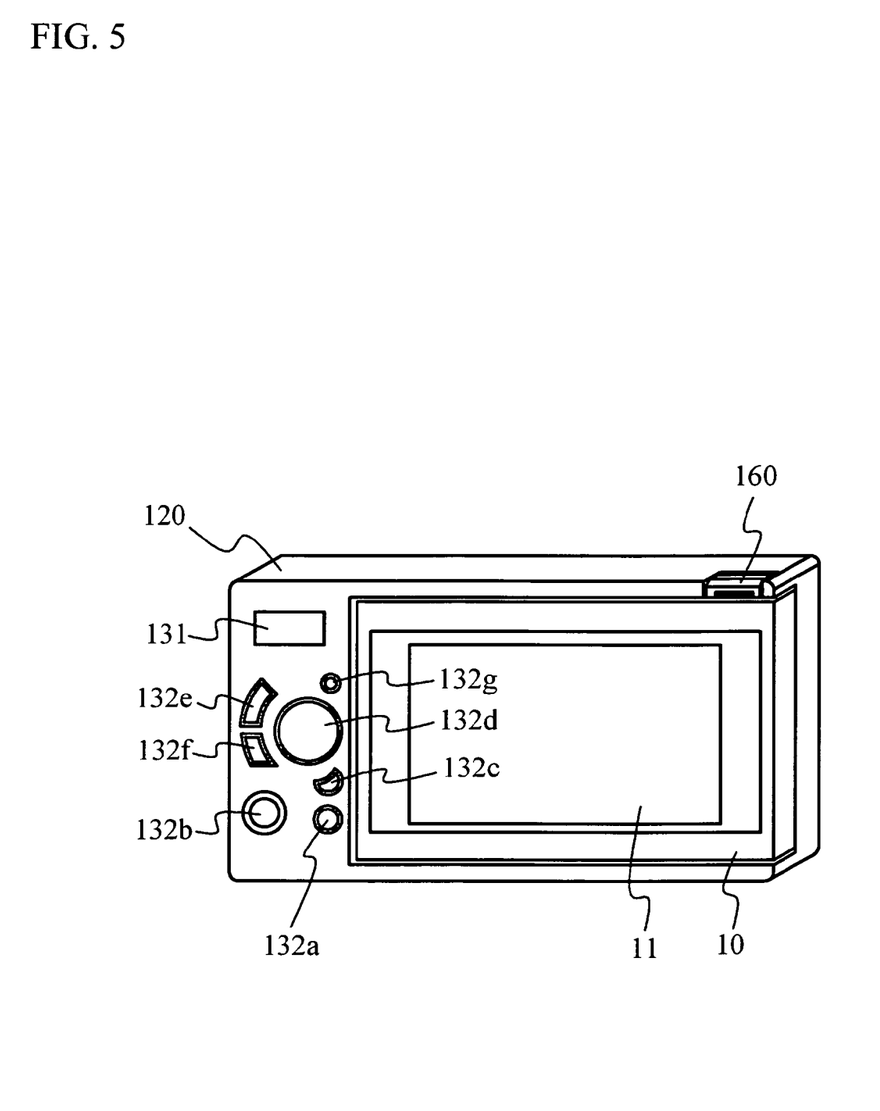
FIG. 5 is a diagram showing a configuration of the front face portion of the vehicle-mounted device.

The operating unit 132 inputs an operation instruction for changing the operation mode of the vehicle-mounted device 100, and an operation instruction for operating in various modes that have been changed. The operating unit 132 is provided with: the tilt/eject button 132a for tilting the front face portion 120; a band/tune button 132b for changing a frequency band of the radio to be reproduced or a track number of the recording medium to be reproduced; a TEXT button 132c for changing a title displayed on the display unit 131; a SCREEN button 132d for changing an image displayed on a display unit 11 to any one of a navigation image or the video of the DVD, or for adjusting volume; a SOURCE/PWR button 132e for changing a source to be reproduced or for turning on/off the power of the vehicle-mounted device 100; a CONTROL button 132f for controlling tone quality; a MUTE/SCREENOFF button 132g for cutting audio or for turning on/off display of the display unit 11, as shown in FIG. 5.

Referring back to FIG. 4, the GPS information receiver, 133 includes a GPS antenna and a tuner, and receives GPS signals from a satellite. The GPS signal received by the GPS information receiver 133 is output through the controller 140, the connector 150, the connector 30, and a controller 20, to a navigation unit 19 of the portable device 10, and then the position of the vehicle, in which the vehicle-mounted device 100 having the portable device 10 therein is determined based on the GPS signal.

The radio receiver 134 has an antenna and a tuner, receives broadcast waves such as AM broadcasting, FM broadcasting, and sound multiplex broadcasting, outputs stereo audio signals, receives and demodulates multiplex data, and outputs the demodulated signal to the controller 140.

The player 135 is composed of a CD/DVD drive which can read out audio data and video data recorded in a recording medium such as a CD and a DVD. The player 135 reads out the audio data and the video data recorded in the recording medium such as the CD and the DVD, and outputs the read-out audio data and the read-out video data to the controller 140.

The sound adjusting unit 136 implements signal processing such as volume control or tone control on an audio signal received or demodulated by the radio receiver 134 or the audio signal reproduced by the player 135, and then outputs the processed signal to a speaker 145.

The memory 137 may be composed of a RAM (Random Access Memory) from which data is readable and into which data is writable, and temporarily stores information necessary for control. The microphone 138 is provided for hands-free communication, and takes in user's voices in the vehicle.

The external voice/video inputting unit 139 is provided with a connection terminal with an external device such as a USB memory or a portable audio device, so that an audio signal or data from the external device may be input. The external voice/video inputting unit 139 then sends the signal or data to the controller 140, and outputs an audio signal, data, or the like to the connected external device.

The controller 140 is composed of a microcomputer having a cache memory, and controls the radio receiver 134, the player 135, and the sound adjusting unit 136, according to the operation by means of the operating unit 132. Also, the controller 140 outputs various signals through the connector 150 to the portable device 10, and controls the vehicle-mounted device 100 on the basis of various signals input from the portable device 10. For example, the controller 140 outputs the GPS signal received by the GPS information receiver 133 and an audio signal input by the microphone 138, to the portable device 10 through the connector 150. Here, the audio signal input by the microphone 138 may be output to the portable device 10 through the connector 150, without through the controller 140.

Further, the controller 140 acquires an operation signal corresponding to a menu image of various modes displayed on the display unit 11 of the portable device 10, from the controller 20 of the portable device 10, and then controls the radio receiver 134 and the player 135.

Also, the power is supplied to the controller 140 from the battery mounted in the vehicle. When the portable device 10 is connected, the controller 140 outputs the power supplied from the battery to the portable device 10. Here, a vehicle speed pulse and an illumination power supply signal are input into the controller 140 from a vehicle. The controller 140 transfers such input vehicle speed pulse to the controller 20 of the portable device 10. Meanwhile, the vehicle speed pulse may be configured not to be input into the vehicle-mounted device 100.

Next, a description will be given of the portable device 10. The portable device 10 is provided with: the display unit 11; an operating unit 12; the GPS information receiver 13; a speaker 14; a rechargeable battery 15; a charge circuit 16; a wireless communication transmitter/receiver 17; a memory 18; the navigation unit 19; the controller 20; and the connector 30.

The display unit 11 is provided with a liquid crystal panel and a backlight, and is capable of displaying map information generated by the navigation unit 19 and guiding path information to a destination, the received broadcasting frequency transferred from the vehicle-mounted device 100, a music track number being played, a music name being played, and the like. Also, the display unit 11 displays the video data input from an external device 200 via the vehicle-mounted device 100.

Here, the display units 11 and 131 may employ a flat panel display other than the liquid crystal panel. For example, an organic light emitting display panel, a plasma display panel, a cold-cathode flat panel display, or the like may be employed.

The operating unit 12 includes a touch panel and a power button for powering on and off the portable device 10. The touch panel may be, for example, disposed over the display screen of the display unit 11. When the touch panel is touched by a finger or a dedicated pen, the touched position is detected to determine whether or not there is an input operation.

The GPS information receiver 13 includes an antenna and a tuner, and receives the GPS signal from a satellite. The received GPS signal is output to the navigation unit 19, and the vehicle location is detected based on the GPS signal. Meanwhile, the vehicle-mounted device 100 is also provided with the GPS information receiver 133. However, when the portable device 10 is attached to the vehicle-mounted device 100, the location of the vehicle in which the vehicle-mounted device 100 having the portable device 10 therein is mounted is specified by use of the GPS signal (and the vehicle speed pulse) received by the GPS information receiver 133. When the portable device 10 is used alone, the location thereof is specified by use of the GPS signal received by the GPS information receiver 13.

The speaker 14 is provided for outputting the audio information of the navigation unit 19, and outputs the audio information only when the portable device 10 is detached from the vehicle-mounted device 100, namely, used alone separately as a single unit.

The rechargeable battery 15 supplies power to each unit of the portable device 10 in a state where the portable device 10 is detached from the vehicle-mounted device 100. When the portable device 10 is attached to the vehicle-mounted device 100, the power is supplied through the power supply terminals of the connector 30 from the battery of the vehicle, and hence the rechargeable battery 15 is charged by the charge circuit 16. Also, the charge circuit 16 is supplied with the power from the connection terminal through a USB slot, not shown, and the rechargeable battery 15 can be charged.

The wireless communication transmitter/receiver 17 sends and receives the voice on communication over a mobile phone, and acquires the information used for navigation over the mobile phone. For example, Bluetooth, which is a wireless transmission system at 2.4 GHz band, is used for the wireless communication transmitter/receiver 17.

The memory 18 may be a RAM from which data is readable and into which the data is writable, and temporarily stores the information read for each control.

The navigation unit 19 includes a map information storing unit that acquires map information used for navigation from an SD (Secure Digital) card or an embedded memory, and stores therein, determines current location information with the GPS signal from the GPS information receiver 133 or 13, and creates a map image for navigation. The created map image may be displayed on the display unit 11. In addition, when the vehicle-mounted device 100 and the portable device 10 are connected, the vehicle speed pulse is acquired from the vehicle so that the accuracy of the location detection of the vehicle in which the vehicle-mounted device 100 having the portable device 10 therein is mounted can be improved. Also, the map information may be retained in the portable device 10.

The controller 20 controls each unit of the portable device 10. Also, the controller 20 outputs various signals to the vehicle-mounted device 100 through the connector 30, and controls the portable device 10 based on various signals input from the vehicle-mounted device 100. For example, the controller 20 acquires the GPS signal received by the GPS information receiver 133 of the vehicle-mounted device 100 and the vehicle speed pulse from the controller 140 of the vehicle-mounted device 100, and outputs the GPS signal and the vehicle speed pulse to the navigation unit 19.

Also, the controller 20 acquires the audio signal input by the microphone 138 of the vehicle-mounted device 100 from the controller 140 of the vehicle-mounted device 100, and controls the navigation unit 19 according to the acquired audio signal. That is to say, the navigation unit 19 can be operated in a hands-free manner. The voice on communication over the mobile phone connected to the wireless communication transmitter/receiver 17 is output to a vehicle-mounted device side through the connector 30, and is caused to output from the speaker 145 of the vehicle-mounted device 100.

The operation signal on the menu screen or content screen displayed on the display unit 11 is output to the controller 140 of the vehicle-mounted device 100 through the connector 30. The controller 140 controls the radio receiver 134 or the player 135 according to the operation signal transmitted from the controller 20 of the portable device 10.

Figure 6A:
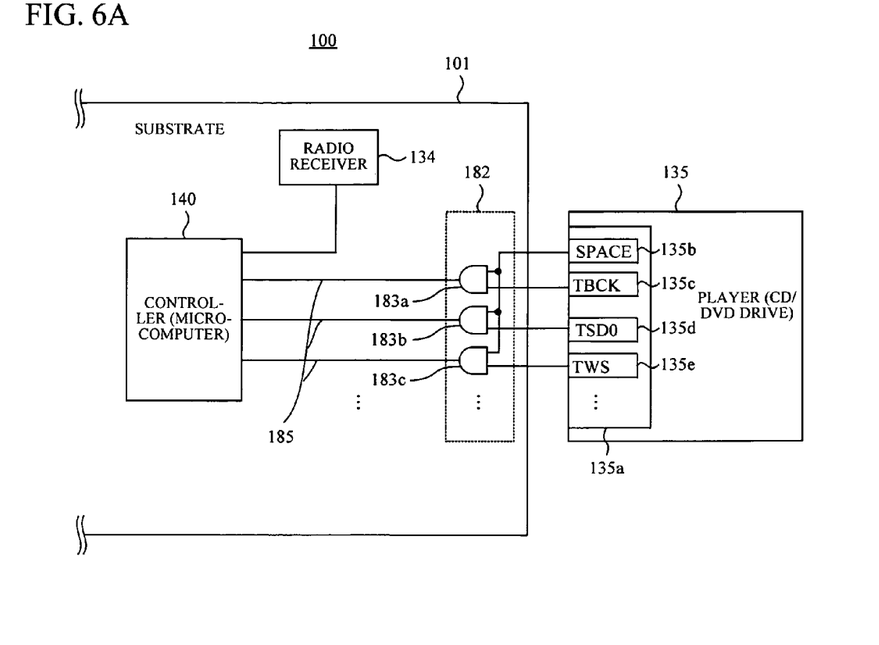
FIGS. 6A and 6B are block diagrams showing connection relationship between a controller and a player in the vehicle-mounted device.
Figure 6B:
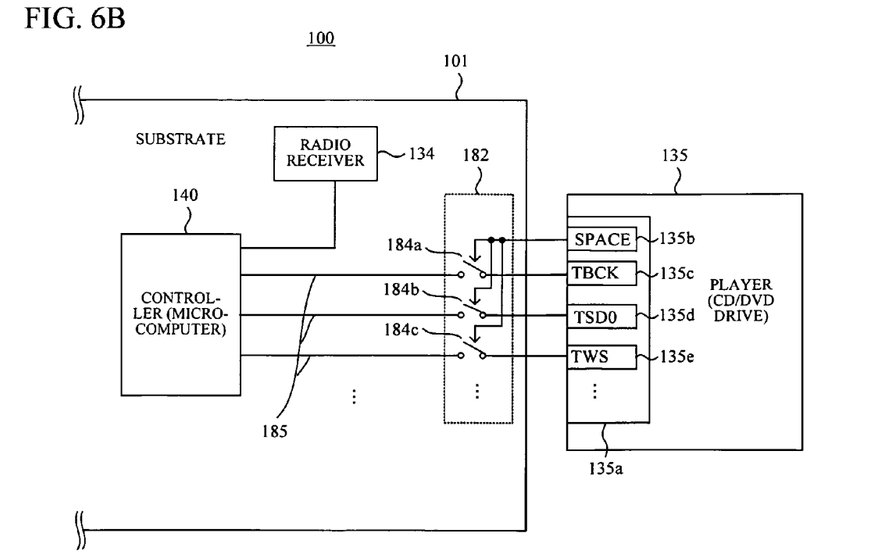

FIGS. 6A and 6B are block diagrams showing connection relationship between the controller 140 and the player 135 in the vehicle-mounted device 100.

As shown in FIGS. 6A and 6B, the player 135 composed of a CD/DVD drive which can reproduce the CD and the DVD includes a connector 135a. The connector 135a includes: a port 135b that outputs a SPACE signal showing whether the CD or the DVD is inserted into the player 135, to the controller 140; a port 135c that outputs a TBCK signal that informs the controller 140 of timing in which data written in the CD or the DVD is read out, to the controller 140; ports 135d and 135e that outputs the data written in the CD or the DVD, as a TSD0 signal and a TWS signal, to the controller 140.

When the CD or the DVD is not inserted into the player 135, the SPACE signal is in a low level state. When the CD or the DVD is inserted into the player 135, the SPACE signal is shifted from the low level state to a high level state.

Also, the controller 140, the radio receiver 134, and an interrupt unit 182 are provided on a substrate 101. When the interrupt unit 182 receives the SPACE signal with the low level, the interrupt unit 182 interrupts transmission of the TBCK signal, the TSD0 signal, and the TWS signal to the controller 140. On the other hand, when the interrupt unit 182 receives the SPACE signal with the high level, the TBCK signal, the TSD0 signal, and the TWS signal are transmitted to the controller 140. Moreover, the interrupt unit 182 is adjacent to the connector 135a of the player 135 and arranged at an edge of the substrate 101. This is because a noise to the electric wave signal received by the radio receiver 134 according to the SPACE signal, the TBCK signal, the TSD0 signal, and the TWS signal that flow from ports 135b to 135e to the interrupt unit 182 is reduced.

In FIG. 6A, the interrupt unit 182 includes AND circuits 183a to 183c. One sides of input ports of the AND circuits 183a to 183c are connected to the port 135b. Another sides of the input ports of the AND circuits 183a to 183c are connected to the ports 135b to 135e, respectively. Output ports of the AND circuits 183a to 183c are connected to the controller 140 via wirings 185.

When the CD or the DVD is inserted into the player 135, the SPACE signal with the high level is output from the port 135b to the AND circuits 183a to 183c. Thereby, the TBCK signal, the TSD0 signal, and the TWS signal output from the ports 135c to 135e are input to the controller 140 via the AND circuits 183a to 183c, respectively. Thus, until the SPACE signal with the high level showing that the CD or the DVD is inserted into the player 135 is input to the interrupt unit 182, the AND circuits 183a to 183c in the interrupt unit 182 interrupts the transmission of the TBCK signal, the TSD0 signal, and the TWS signal to the controller 140. It is therefore possible to reduce the noise (i.e., the noise to the electric wave signal received by the radio receiver 134) caused by the signals being always output.

On the other hand, in FIG. 6B, the interrupt unit 182 includes switching circuits 184a to 184c. One sides of the switching circuits 184a to 184c are connected to the controller 140, and another sides thereof are connected to the ports 135c to 135e. Also, the SPACE signal output from the port 135b is input to the switching circuits 184a to 184c.

When the CD or the DVD is inserted into the player 135, the SPACE signal with the high level is output to the switching circuits 184*a* to 184*c*. Thereby, the switching circuits 184*a* to 184*c* come to an ON state, and the TBCK signal, the TSD0 signal, and the TWS signal output from the ports 135*c* to 135*e* are input to the controller 140 via the switching circuits 184*a* to 184*c*, respectively.

Thus, until the SPACE signal with the high level showing that the CD or the DVD is inserted into the player 135 is input to the interrupt unit 182, the switching circuits 184*a* to 184*c* in the interrupt unit 182 interrupts the transmission of the TBCK signal, the TSD0 signal, and the TWS signal to the controller 140. It is therefore possible to reduce the noise (i.e., the noise to the electric wave signal received by the radio receiver 134) caused by the signals being always output.

Figure 7:
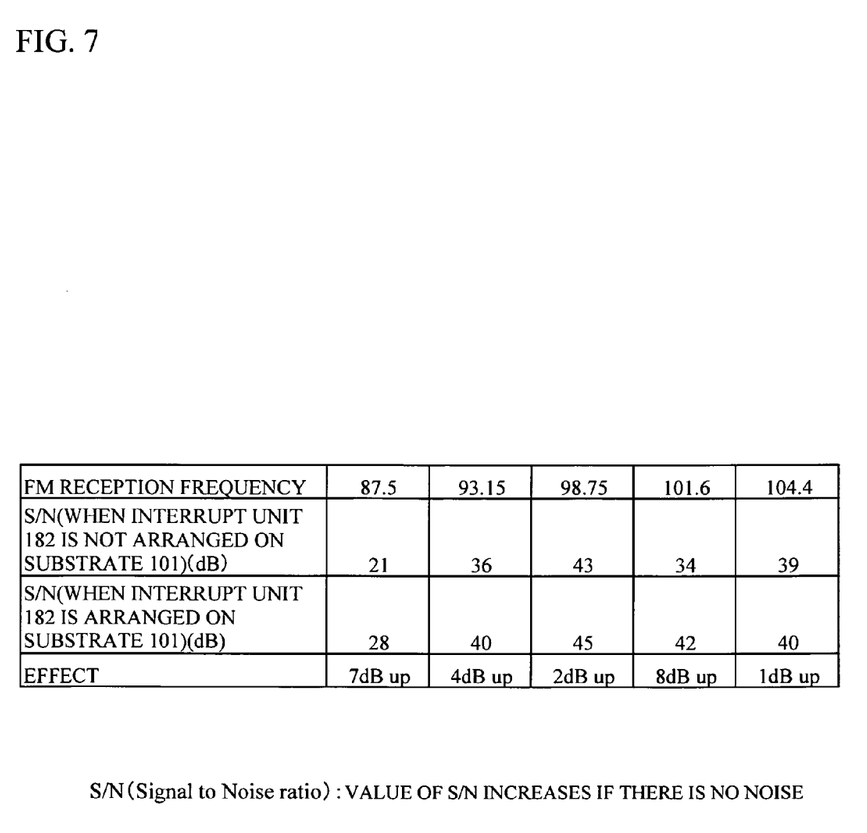
FIG. 7 is a diagram showing an example of inspecting a noise to an electric wave signal when an interrupt unit is arranged on a substrate and when the interrupt unit is not arranged on the substrate.

FIG. 7 is a diagram showing an example of inspecting the noise to the electric wave signal when the interrupt unit 182 in FIG. 6A is actually arranged on the substrate 101 and when the interrupt unit 182 is not arranged on the substrate 101.

When the interrupt unit 182 is arranged on the substrate 101, the noise to the electric wave signal is reduced over all reception frequencies of the radio receiver 134 as shown in FIG. 7, compared to a case where the interrupt unit 182 is not arranged on the substrate 101.

As described above, according to the present embodiment, the vehicle-mounted device 100 includes: the player 135 that reads out and outputs data recorded in the CD or the DVD (i.e., the TBCK signal, the TSD0 signal, and the TWS signal); the controller 140 that receives the data (i.e., the TBCK signal, the TSD0 signal, and the TWS signal) output from the player 135, and executes various controls based on the received data; and the interrupt unit 182 that interrupts the transmission of the data recorded in the CD or the DVD to the controller 140 until the CD or the DVD is inserted into the player 135. Therefore, it is possible to reduce the noise caused by the signal or data being always output.

Also, the player 135 includes a connector 135*a* outputting data and signal, the interrupt unit 182 and the controller 140 is provided on the substrate 101, and the interrupt unit 182 is arranged at the edge of the substrate 101 which is adjacent to the connector 135*a*. It is therefore possible to reduce the noise to the electric wave signal received by the radio receiver 134 according to the SPACE signal, the TBCK signal, the TSD0 signal, and the TWS signal that flow from ports 135*b* to 135*e* to the interrupt unit 182.

Moreover, the interrupt unit 182 is composed of the switching circuits 184*a* to 184*c* or the AND circuits 183*a* to 183*c* that begin the transmission of the data recorded in the CD or the DVD to the controller 140 by inputting the signal (i.e., the SPACE signal with the high level) showing that the CD or the DVD is inserted into the player 135. Accordingly, the user inserts the CD or the DVD into the player 135, so that the transmission of the data recorded in the CD or the DVD to the controller 140 can be begun automatically.

Also, the vehicle-mounted device 100 may be the vehicle-mounted audio device that is capable of attaching and detaching the portable device 10, and it is therefore possible to reduce a noise to the sound reproduced in the vehicle.

Although in the above-mentioned embodiment, the vehicle-mounted device 100 is used as an example of the electronic device, the present invention is not limited to this. For example, the electronic device according to the present invention may be a computer, a recorder, a navigation device (or a vehicle-mounted navigation device), an audio device (or a vehicle-mounted audio device), or the like that comprises a DVD drive or a CD drive.

A recording medium on which the software program for realizing the functions of the vehicle-mounted device 100 is recorded may be supplied to the vehicle-mounted device 100, and the controller 140 may read and execute the program recorded on the recording medium. In this manner, the same effects as those of the above-described embodiment can be achieved. The recording medium for providing the program may be a CD-ROM, a DVD, or a SD card, for example.

Alternatively, the controller 140 of the vehicle-mounted device 100 may execute a software program for realizing the functions of the vehicle-mounted device 100, so as to achieve the same effects as those of the above-described embodiment.

It should be noted that the present invention is not limited to above-described embodiment, and various modifications may be made to it without departing from the scope of the invention.

The invention claimed is:

1. An electronic device, comprising:
   a data readout portion that reads out and outputs data recorded in a recording medium;
   a controller that receives the data output from the data readout portion, and executes various controls based on the received data; and
   an interrupt portion that, when the interrupt portion receives a signal indicating that the recording medium is not inserted into the data readout portion, interrupts transmission of a timing signal that informs the controller of timing in which data written in the recording medium is read out.

2. The electronic device as claimed in claim 1, wherein the data readout portion includes a connector outputting the signal relating to the data recorded in the recording medium,
   the interrupt portion and the controller are provided on the same substrate, and
   the interrupt portion is arranged at an edge of the substrate which is adjacent to the connector.

3. The electronic device as claimed in claim 1, wherein the interrupt portion is composed of a switching circuit or an AND circuit that begins the transmission of a signal that informs the controller of timing in which data recorded in the recording medium is read out, to the controller by inputting a signal showing that the recording medium is inserted into the data readout portion.

4. The electronic device as claimed in claim 1, wherein the electronic device is a vehicle-mounted audio device.

5. The electronic device as claimed in claim 2, wherein the interrupt portion is composed of a switching circuit or an AND circuit that begins the transmission of a signal that informs the controller of timing in which data recorded in the recording medium is read out, to the controller by inputting a signal showing that the recording medium is inserted into the data readout portion.

6. The electronic device as claimed in claim 2, wherein the electronic device is a vehicle-mounted audio device.

7. The electronic device as claimed in claim 3, wherein the electronic device is a vehicle-mounted audio device.

8. The electronic device as claimed in claim 5, wherein the electronic device is a vehicle-mounted audio device.

9. An electronic device, comprising:
   a data readout portion that reads out and outputs data recorded in a recording medium;
   a controller that receives the data output from the data readout portion, and executes various controls based on the received data; and
   an interrupt portion that interrupts, based on a signal that is output from the data readout portion and indicates whether the recording medium is inserted into the data readout portion, transmission of a signal relating to the data recorded in the recording medium to the controller until the recording medium is inserted into the data readout portion, wherein the data readout portion includes a connector outputting the signal relating to the data recorded in the recording medium, the interrupt portion and the controller are provided on the same substrate, and the interrupt portion is arranged at an edge of the substrate which is adjacent to the connector.

10. The electronic device as claimed in claim 9, wherein the interrupt portion is composed of a switching circuit or an AND circuit that begins the transmission of a signal that informs the controller of timing in which data recorded in the recording medium is read out, to the controller by inputting a signal showing that the recording medium is inserted into the data readout portion.

11. The electronic device as claimed in claim 9, wherein the electronic device is a vehicle-mounted audio device.

12. An electronic device, comprising:

a data readout portion that reads out and outputs data recorded in a recording medium;

a controller that receives the data output from the data readout portion, and executes various controls based on the received data; and an interrupt portion that interrupts, based on a signal that is output from the data readout portion and indicates whether the recording medium is inserted into the data readout portion, transmission of a signal relating to the data recorded in the recording medium to the controller until the recording medium is inserted into the data readout portion, wherein the interrupt portion is composed of a switching circuit or an AND circuit that begins the transmission of a signal that informs the controller of timing in which data recorded in the recording medium is read out, to the controller by inputting a signal showing that the recording medium is inserted into the data readout portion.

13. The electronic device as claimed in claim 12, wherein the electronic device is a vehicle-mounted audio device.

* * * * *